(12) United States Patent
Zhao et al.

(10) Patent No.: US 12,431,587 B2
(45) Date of Patent: Sep. 30, 2025

(54) COMPOSITE SEPARATOR INCLUDING FIRE SUPPRESSION LAYER CONTAINING CROSSLINKED CYCLOPOLYPHOSPHAZENE PARTICLES AND ELECTROCHEMICAL CELL INCLUDING THE SAME

(71) Applicant: GM GLOBAL TECHNOLOGY OPERATIONS LLC, Detroit, MI (US)

(72) Inventors: Yifan Zhao, Warren, MI (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 565 days.

(21) Appl. No.: 17/896,804

(22) Filed: Aug. 26, 2022

(65) Prior Publication Data
US 2024/0088521 A1     Mar. 14, 2024

(51) Int. Cl.
| | |
|---|---|
| *H01M 50/449* | (2021.01) |
| *C08G 73/02* | (2006.01) |
| *H01M 10/0525* | (2010.01) |
| *H01M 50/403* | (2021.01) |
| *H01M 50/417* | (2021.01) |
| *H01M 50/491* | (2021.01) |

(52) U.S. Cl.
CPC ...... *H01M 50/449* (2021.01); *C08G 73/0266* (2013.01); *H01M 10/0525* (2013.01); *H01M 50/403* (2021.01); *H01M 50/417* (2021.01); *H01M 50/491* (2021.01)

(58) Field of Classification Search
CPC ............. H01M 50/449; H01M 50/403; H01M 50/417; H01M 50/491; H01M 10/0525; C08G 73/0266
USPC ........................................ 429/144, 251, 253
See application file for complete search history.

(56) References Cited

FOREIGN PATENT DOCUMENTS

| CN | 108822586 A | * | 11/2018 | ............... C09D 1/00 |
|---|---|---|---|---|
| CN | 109134544 A | * | 1/2019 | ........... C07F 9/65815 |
| CN | 109980162 A | * | 7/2019 | |
| CN | 116683119 A | * | 9/2023 | ........... C08G 73/1064 |
| CN | 117638400 A | | 3/2024 | |
| DE | 102023101700 A1 | | 2/2024 | |
| KR | 2022088084 A | * | 6/2022 | |

OTHER PUBLICATIONS

Fu et al., Enhanced wettability and electrochemical performance of separators for lithium-ion batteries by coating core-shell structured silica-poly(cyclotriphosphazene-co-4,4'-sulfonyldiphenol) particles, Jul. 2019, Journal of Power Sources, 436, 226839 (Year: 2019).*

(Continued)

*Primary Examiner* — Sean P Cullen
(74) *Attorney, Agent, or Firm* — Harness, Dickey & Pierce, P.L.C.

(57) ABSTRACT

A separator for an electrochemical cell that cycles lithium ions includes a microporous layer and one or more fire suppression layers disposed on at least one of a first side or an opposite second side of the microporous layer. The one or more fire suppression layers include crosslinked cyclopolyphosphazene particles.

16 Claims, 4 Drawing Sheets

(56) References Cited

OTHER PUBLICATIONS

Kuirong Deng et al.; "Nonflammable organic electrolytes for high-safety lithium-ion batteries"; Energy Storage Materials, 32; Jul. 24, 2020; pp. 425-447.
Yan Wang et al.; "Preparation and Properties of Novel Crosslinked Polyphosphazene—Aromatic Ethers Organic-Inorganic Hybrid Microspheres"; Polymers; Jun. 14, 2021; 11 pages.
First Office Action for German Patent Application No. 102023101700.4 issued Apr. 4, 2025, with correspondence from Manitz Finsterwald Patent- und Rechtsanwaltspartnerschaft mbB; 7 pages.

* cited by examiner

COMPOSITE SEPARATOR INCLUDING FIRE SUPPRESSION LAYER CONTAINING CROSSLINKED CYCLOPOLYPHOSPHAZENE PARTICLES AND ELECTROCHEMICAL CELL INCLUDING THE SAME

INTRODUCTION

This section provides background information related to the present disclosure which is not necessarily prior art.

The present disclosure generally relates to electrochemical cells that cycle lithium ions and, more particularly, to separators for electrochemical cells that cycle lithium ions, wherein the separators exhibit fire suppression capabilities.

Electrochemical cells of secondary lithium batteries generally include a negative electrode and a positive electrode spaced apart from one another by a porous separator. The negative and positive electrodes and the porous separator are infiltrated with a liquid electrolyte that provides a medium for the conduction of lithium ions between the negative and positive electrodes during discharge and recharge of the electrochemical cell. Porous separators of lithium batteries are generally made of ionically conductive and electrically insulating polymers and are oftentimes in the form of a thin membrane or film.

Manufacturing defects, aging, and/or certain abuse conditions may impair the thermal stability of secondary lithium batteries. Certain conditions that increase the internal temperature of lithium batteries may set-off undesirable events and/or chemical reactions within the batteries that may lead to further undesirable heat generation. Because components of lithium batteries and/or of their surrounding environment may be flammable, it may be desirable to incorporate materials into the internal components of such batteries that can effectively inhibit propagation of combustion chain reactions.

SUMMARY

This section provides a general summary of the disclosure and is not a comprehensive disclosure of its full scope or all of its features.

The present disclosure relates to a separator for an electrochemical cell that cycles lithium ions. The separator comprises a microporous layer and one or more fire suppression layers. The microporous layer has a first side and an opposite second side. The one or more fire suppression layers are disposed on at least one of the first side or the second side of the microporous layer. The one or more fire suppression layers comprise crosslinked cyclopolyphosphazene particles.

The crosslinked cyclopolyphosphazene particles may be formed by a nucleophilic polycondensation polymerization reaction between a cyclophosphazene and a comonomer.

The cyclophosphazene may be an organophosphorus compound represented by the formula:

where $X^1$, $X^2$, $X^3$, $X^4$, $X^5$, and $X^6$ are each individually a halide.

The comonomer may comprise a polyphenol, a polyaniline, or a combination thereof.

In some aspects, the comonomer may comprise 4,4'-(hexafluoroisopropylidene)diphenol; 4,4'-sulfonyldiphenol; 4,4'-(9-fluorenylidene)diphenol; phenolphthalein; oxyresveratrol; resveratrol; dopamine; or a combination thereof.

In some aspects, the comonomer may comprise 4 4'-(hexafluoroisopropylidene)dianiline; 4,4'-sulfonyldianiline; 4,4'-(9-fluorenylidene)dianiline; anilinephthalein; or a combination thereof.

The crosslinked cyclopolyphosphazene particles may be spherical particles having mean particle diameters of greater than or equal to about 50 nanometers to less than or equal to about 2 micrometers.

The crosslinked cyclopolyphosphazene particles may be tubular particles having widths of greater than or equal to about 50 nanometers to less than or equal to about 200 nanometers and lengths of greater than or equal to about 500 nanometers to less than or equal to about 2 micrometers.

The one or more fire suppression layers may further comprise particles of a ceramic material. The ceramic material may comprise alumina, silica, a dehydrated zeolite, a lithiated zeolite, or a combination thereof.

The particles of the ceramic material may have a mean particle diameter of greater than or equal to about 50 nanometers to less than or equal to about 5 micrometers.

The one or more fire suppression layers may further comprise a binder.

The microporous layer may comprise a polyolefin.

Each of the one or more fire suppression layers may have a thickness of greater than or equal to about 1 micrometer to less than or equal to about 30 micrometers.

The crosslinked cyclopolyphosphazene particles may constitute, by mass, greater than or equal to about 1% to less than or equal to about 80% of the one or more fire suppression layers.

An electrochemical cell that cycles lithium ions is disclosed. The electrochemical cell comprises a negative electrode, a positive electrode spaced apart from the negative electrode, and a composite separator sandwiched between the negative electrode and the positive electrode. The positive electrode comprises a transition metal oxide that can undergo a reversible intercalation of lithium ions. The composite separator comprises a microporous layer having a first side and an opposite second side and one or more fire suppression layers disposed on at least one of the first side or the second side of the microporous layer. The microporous layer comprises a polyolefin. The one or more fire suppression layers comprise crosslinked cyclopolyphosphazene particles. The crosslinked cyclopolyphosphazene particles are formed by a nucleophilic polycondensation polymerization reaction between a cyclophosphazene and a comonomer.

The cyclophosphazene may be an organophosphorus compound represented by the chemical formula:

where $X^1$, $X^2$, $X^3$, $X^4$, $X^5$, and $X^6$ are each individually a halide. The comonomer may comprise a polyphenol, a polyaniline, or a combination thereof.

The one or more fire suppression layers may further comprise particles of a ceramic material. The ceramic material may comprise alumina, silica, a dehydrated zeolite, a lithiated zeolite, or a combination thereof.

The electrochemical cell may further comprise a liquid electrolyte infiltrating pores of the composite separator and establishing a lithium-ion transport path between the negative electrode and the positive electrode. The liquid electrolyte may comprise a lithium salt dissolved in a nonaqueous organic solvent. The nonaqueous organic solvent may comprise an organic carbonate, an aliphatic carboxylic ester, or a combination thereof.

The crosslinked cyclopolyphosphazene particles may exhibit a solubility of, by mass, less than or equal to about 1% in the nonaqueous organic solvent.

A method of manufacturing a composite separator for an electrochemical cell that cycles lithium ions is disclosed. In the method, a precursor mixture is prepared. The precursor mixture comprises a cyclophosphazene, a comonomer, an organic solvent, and a tertiary amine catalyst. The cyclophosphazene has the chemical formula $(\text{---}N\text{==}P(\text{---}X)_2\text{---})_3$, where X is a halogen, and the comonomer comprises a polyphenol, a polyaniline, or a combination thereof. Preparation of the precursor mixture initiates a nucleophilic polycondensation polymerization reaction between the cyclophosphazene and the comonomer and forms crosslinked cyclopolyphosphazene particles. The crosslinked cyclopolyphosphazene particles are dispersed in a solvent to form a slurry. The slurry is deposited on at least one of a first side or an opposite second side of a microporous polyolefin layer. Then, the solvent is removed from the slurry to form one or more fire suppression layers disposed on at least one of the first side or the second side of the microporous polyolefin layer.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight.

The term "battery" means a device that includes multiple interconnected electrochemical cells (battery cells) arranged in series and/or parallel and may refer to battery cells that are grouped together in the form of battery modules and/or battery packs.

Example embodiments will now be described more fully with reference to the accompanying drawings.

The presently disclosed composite separators are formulated for use in electrochemical cells that cycle lithium ions to help prevent or inhibit propagation of combustion chain reactions with the electrochemical cells. The composite separators include a microporous layer and one or more fire suppression layers disposed on at least one of a first side or an opposite second side of the microporous layer. The one or more fire suppression layers comprise crosslinked cyclopolyphosphazene particles. The crosslinked cyclopolyphosphazene particles can effectively quench, suppress, and/or terminate combustion chain reactions when exposed to thermal runaway temperatures.

Figure 1:
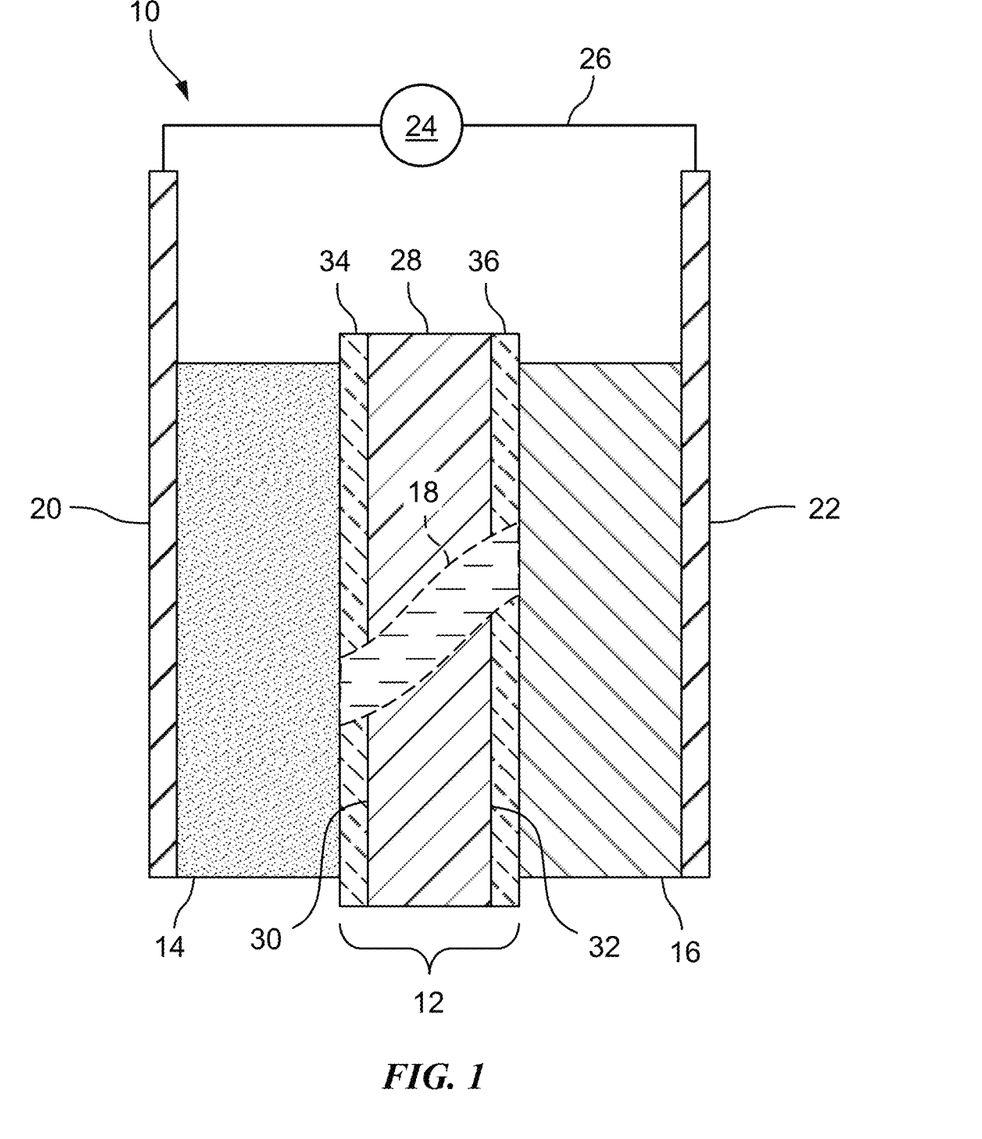
FIG. 1 is a schematic side cross-sectional view of an electrochemical cell that cycles lithium ions, wherein the electrochemical cell includes a composite separator sandwiched between a negative electrode and a positive electrode and a liquid electrolyte infiltrating pores of the composite separator.

FIG. 1 depicts a schematic side cross-sectional view of an electrochemical cell 10 that cycles lithium ions. The electrochemical cell 10 may be combined with one or more additional electrochemical cells to form a secondary lithium battery, such as a lithium-ion battery or a lithium metal battery. The electrochemical cell 10 includes a composite separator 12 sandwiched between a positive electrode 14 and a negative electrode 16. The composite separator 12 is infiltrated with a liquid electrolyte 18 that provides a medium for the conduction of lithium ions between the positive electrode 14 and the negative electrode 16. The positive electrode 14 is disposed on a major surface of a positive electrode current collector 20, and the negative electrode 16 is disposed on a major surface of a negative electrode current collector 22. In practice, the positive and negative electrode current collectors 20, 22 may be electrically coupled to a power source or load 24 via an external circuit 26.

Figure 2:
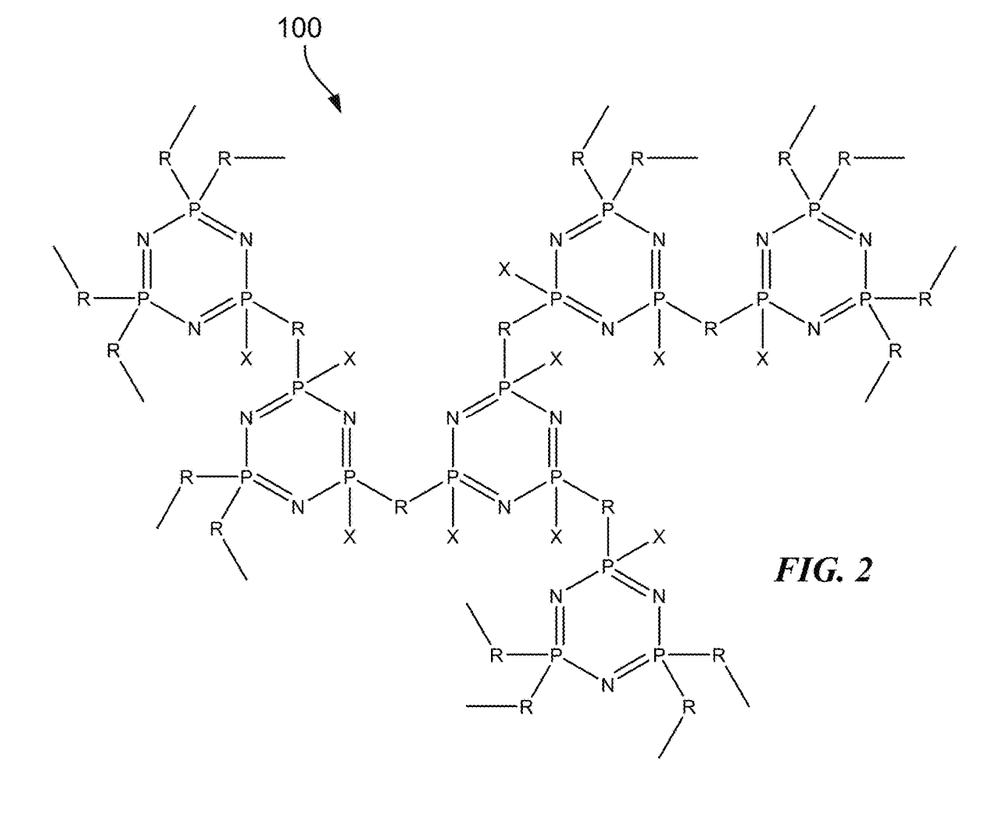
FIG. 2 is a schematic depiction of a crosslinked cyclopolyphosphazene macromolecule including multiple interconnected cyclophosphazene monomers bridged together by organic comonomers.

The composite separator 12 physically and electrically isolates the positive electrode 14 and the negative electrode 16 from each other while allowing lithium ions to pass therethrough. As shown in FIGS. 1 and 2, the composite separator 12 comprises a microporous layer 28, having a first side 30 and an opposite second side 32, and at least one fire suppression layer disposed on the first side 30 and/or the second side 32 of the microporous layer 28. The first side 30 of the microporous layer 28 faces toward the positive electrode 14 and the second side 32 of the microporous layer 28 faces toward the negative electrode 16. The composite separator 12 depicted in FIGS. 1 and 2 includes a first fire suppression layer 34 disposed on the first side 30 of the microporous layer 28 and a second fire suppression layer 36 disposed on the second side 32 of the porous microporous layer 28. The first fire suppression layer 34 may be disposed directly on a surface of the microporous layer 28 defined by the first side 30 thereof and the second fire suppression layer 36 may be disposed directly on a surface of the microporous layer 28 defined by the second side 32 thereof.

The microporous layer 28 exhibits an open microporous structure and may comprise one or more ionically conductive and electrically insulating polymers. The microporous layer 28 may be in the form of a continuous membrane or film, or the microporous layer 28 may comprise a discontinuous non-woven material, e.g., a manufactured sheet, web, or mat of directionally or randomly oriented fibers. Examples of ionically conductive and electrically insulating polymers include polyolefins, e.g., polyethylene (PE), polypropylene (PP), polyethylene terephthalate (PET), polyamide (PA), poly(tetrafluoroethylene) (PTFE), polyvinylidene fluoride (PVdF), and/or poly(vinyl chloride) (PVC). The microporous layer 28 may comprise a single polymer or a combination of polymers. In some aspects, the microporous layer 28 may comprise a laminate of one or more polymers, e.g., a laminate of PE, PP, and/or PET. The microporous layer 28 may have a thickness of greater than or equal to about 100 nanometers or about 5 micrometers to less than or equal to about 30 micrometers or about 20 micrometers and a porosity of greater than or equal to about 25% to less than or equal to about 75%.

The fire suppression layers 34, 36 are configured to provide the composite separator 12 with mechanical integrity and thermal stability at high temperatures (e.g., temperatures greater than or equal to about 150° C.), and to help prevent or inhibit the propagation of combustion chain reactions within the electrochemical cell 10 during a thermal runaway event. The fire suppression layers 34, 36 may have a thickness of greater than or equal to about 1 micrometer to less than or equal to about 30 micrometers and a porosity of greater than or equal to about 20% to less than or equal to about 80%.

The fire suppression layers 34, 36 may comprise, consist essentially of, or consist of crosslinked cyclopolyphosphazene particles. The crosslinked cyclopolyphosphazene particles are configured to quench, suppress, and/or terminate combustion chain reactions that may occur in the electrochemical cell 10 during a thermal runaway event. Without intending to be bound by theory, it is believed that, when the crosslinked cyclopolyphosphazene particles are exposed to relatively high temperatures (e.g., temperatures greater than about 150° C.), the crosslinked cyclopolyphosphazene particles may thermally decompose and produce gaseous chemical compounds or species that effectively quench, remove, or interfere with free radical-initiated combustion chain reactions occurring within the electrochemical cell 10.

The crosslinked cyclopolyphosphazene particles are formulated to be substantially chemically nonreactive with and insoluble (or having very low solubility) in the liquid electrolyte 18. For example, the crosslinked cyclopolyphosphazene particles may exhibit a solubility of, by weight, less than or equal to about 1% in the one or more nonaqueous organic solvents (e.g., in the one or more organic carbonates and/or aliphatic carboxylic esters) included in the liquid electrolyte 18. Without intending to be bound by theory, it is believed that the low solubility of the crosslinked cyclopolyphosphazene particles in the liquid electrolyte 18 may allow the crosslinked cyclopolyphosphazene particles to be included in the electrochemical cell 10 without negatively impacting the performance or cycle life of the electrochemical cell 10.

The crosslinked cyclopolyphosphazene particles may be formed by a nucleophilic polycondensation polymerization reaction between a cyclophosphazene and a comonomer. The polymerization reaction may be performed by preparing a precursor mixture comprising the cyclophosphazene, the comonomer, an organic solvent, and optionally a catalyst.

The cyclophosphazene may be an organophosphorus compound including a 6-membered ring of alternating phosphorus and nitrogen atoms with alternating single and double bonds therebetween. For example, the cyclophosphazene may comprise an organophosphorus compound represented by the following chemical formula:

(1)

where $X^1$, $X^2$, $X^3$, $X^4$, $X^5$, and $X^6$ are each individually a halide, e.g., F, Cl, Br, and/or I.

The comonomer may be a polyfunctional organic nucleophilic compound. For example, the comonomer may comprise a polyphenol (a chemical compound having two or more phenol groups, —$C_6H_4OH$) or a polyaniline (a chemical compound having two or more aniline groups, —$C_6H_4NH_2$). Examples of polyphenols include 4,4'-(hexafluoroisopropylidene)diphenol (BPAF or Bisphenol AF); 4,4'-sulfonyldiphenol (BPS or Bisphenol S); 4,4'-(9-Fluorenylidene)diphenol (BPFL or Bisphenol FL); phenolphthalein; oxyresveratrol; resveratrol; dopamine; and combinations thereof. Examples of polyanilines include 4 4'-(hexafluoroisopropylidene)dianiline; 4,4'-sulfonyldianiline; 4,4'-(9-fluorenylidene)dianiline; anilinephthalein; and combinations thereof.

The organic solvent may comprise a polar aprotic solvent. Examples of polar aprotic solvents include acetone, acetonitrile, tetrahydrofuran (THF), and combinations thereof.

The catalyst may comprise a Lewis base (an acid acceptor) that can react with and/or absorb acidic species (e.g., HCl, HF, HBr, and/or HI) generated as a byproduct of the polymerization reaction. The catalyst may effectively increase the rate of polymerization. For example, the catalyst may comprise a tertiary amine NRR'R", where R, R, and R" are each individually an alkyl or aryl group. Examples of alkyl groups include methyl groups (—$CH_3$) and ethyl groups (—$CH_2CH_3$). Examples of aryl groups include phenyl groups (—$C_6H_5$) and benzyl groups (—$C_6H_5CH_2$). Examples of tertiary amines include triethylamine (TEA) and trimethylamine The catalyst may have a pKa of greater than or equal to about 9.5 or greater than or equal to about 10.

During the polymerization reaction, the cyclophosphazene and the comonomer may covalently bond to one another to form highly crosslinked cyclopolyphosphazene macromolecules. In the crosslinked cyclopolyphosphazene macromolecules, the cyclophosphazene monomers may be connected or bridged together by the comonomers. As shown in FIG. 2, a crosslinked cyclopolyphosphazene macromolecule 100 may comprise a network of cyclophosphazene monomers bridged together by comonomers (R), where X represents a halide, e.g., F, Cl, Br, or I. Each of the cyclophosphazene monomers comprises a 6-membered ring of alternating phosphorus (P) atoms and nitrogen (N) atoms with alternating single and double bonds therebetween. At least one phosphorus atom in each cyclophosphazene monomer is connected to another cyclophosphazene monomer by a comonomer R. Phosphorus atoms in the cyclophosphazene monomers that are not connected to another cyclophosphazene monomer (i.e., by a comonomer R) may be connected to a halide or to a comonomer R.

Figure 3:
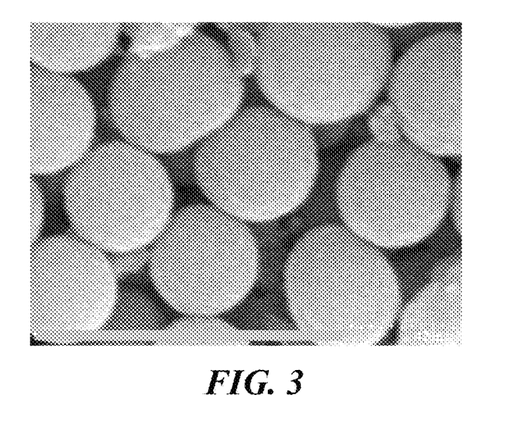
FIG. 3 is a scanning electron microscope image of spherical-shaped particles of a crosslinked cyclopolyphosphazene.
Figure 4:
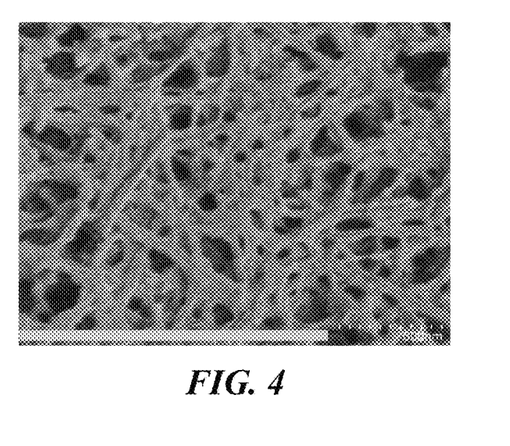
FIG. 4 is a scanning electron microscope image of tube-shaped particles of a crosslinked cyclopolyphosphazene.

In some aspects, as shown in FIG. 3, the crosslinked cyclopolyphosphazene particles may be in the form of spherical particles. In some aspects, as shown in FIG. 4, the crosslinked cyclopolyphosphazene particles may be in the form of tubular particles. The physical shape of the crosslinked cyclopolyphosphazene particles may depend on the polymerization reaction conditions. For example, without intending to be bound by theory, it is believed that, if the precursor mixture is stirred or agitated during and/or throughout the polymerization reaction, the resulting crosslinked cyclopolyphosphazene particles will aggregate together to form spherical particles. On the other hand, if the precursor mixture is allowed to sit without stirring or other agitation during the polymerization reaction, the resulting crosslinked cyclopolyphosphazene particles will be in the form of tubular particles. By not stirring or agitating the precursor mixture it is believed that the acidic species (e.g., HCl, HF, HBr, and/or HI) generated as a byproduct of the polymerization reaction may react with the basic catalyst to form needle-shaped salt crystals (e.g., triethylamine hydrochloride crystals). In such case, the needle-shaped salt crystals may function as a template for the crosslinked cyclopolyphosphazene particles, resulting in the formation of crosslinked cyclopolyphosphazene tubular particles. As another example, the concentration of the cyclophosphazene, the comonomer, and/or the catalyst in the precursor mixture may affect the resulting shape of the crosslinked cyclopolyphosphazene particles. Without intending to be bound by theory, it is believed that, preparing a precursor mixture with a relatively high concentration of the cyclophosphazene, the comonomer, and/or the catalyst may promote the precipitation of needle-shaped salt crystals from the precursor mixture during the polymerization reaction and the formation of crosslinked cyclopolyphosphazene tubular particles.

When the crosslinked cyclopolyphosphazene particles are in the form of spherical particles, the spherical particles may have mean particle diameters of greater than or equal to about 50 nanometers to less than or equal to about 2 micrometers. In some aspects, the crosslinked cyclopolyphosphazene particles may be in the form of spherical particles having mean particle diameters of greater than or equal to about 400 nanometers to less than or equal to about 800 nanometers. When the crosslinked cyclopolyphosphazene particles are in the form of tubular particles, the tubular particles may have widths of greater than or equal to about 50 nanometers to less than or equal to about 200 nanometers and lengths of greater than or equal to about 500 nanometers to less than or equal to about 2 micrometers.

After formation of the crosslinked cyclopolyphosphazene particles, the crosslinked cyclopolyphosphazene particles may be separated from the organic solvent, the catalyst, and reaction byproducts by filtration. Then, the crosslinked cyclopolyphosphazene particles may be dried to remove residual solvent.

The crosslinked cyclopolyphosphazene particles may constitute, by mass, greater than or equal to about 1%, optionally about 30%, or optionally about 50% to less than or equal to about 80%, or optionally about 60% of the fire suppression layers 34, 36.

The fire suppression layers 34, 36 optionally may comprise particles of a porous ceramic material. The porous ceramic material may provide the fire suppression layers 34, 36 with high mechanical strength and thermal stability. The porous ceramic material may comprise an inorganic material that exhibits high mechanical strength, thermal stability, and is chemically nonreactive with other components of the electrochemical cell 10 (e.g., the positive and negative electrodes 14, 16 and the electrolyte 18). In aspects, the porous ceramic material may comprise, consist essentially of, or consist of alumina ($Al_2O_3$), silica ($SiO_2$), and/or a dehydrated natural or synthetic zeolite. Zeolites are porous crystalline aluminosilicate materials comprising a three-dimensional framework of $AlO_2$ and $SiO_2$ tetrahedral units and extra-framework cations. Each $AlO_2$ unit introduces one negative charge to the framework, which is offset by the extra-framework cations. The extra-framework cations may be organic or inorganic in nature. In some aspects, the ceramic material may comprise a lithiated zeolite having a three-dimensional framework of $AlO_2$ and $SiO_2$ tetrahedral units and extra-framework lithium cations ($Li^+$). When the ceramic material comprises a zeolite, the zeolite may be substantially free of the following extra-framework cations: $Na^+$ and $H^+$ The ceramic material particles may have mean particle diameters of greater than or equal to about 50 nanometers to less than or equal to about 5 micrometers.

When present in the fire suppression layers 34, 36, the ceramic material particles may constitute, by mass, greater than or equal to about 5%, optionally about 20%, or optionally about 30% to less than or equal to about 99%, optionally about 80%, or optionally about 50% of the fire suppression layers 34, 36. When present in the fire suppression layers 34, 36, the mass ratio of the ceramic material particles to the crosslinked cyclopolyphosphazene particles in the fire suppression layers 34, 36 may be in a range of about 1:99 to about 99:1. In some aspects, the mass ratio of the ceramic material particles to the crosslinked cyclopolyphosphazene particles in the fire suppression layers 34, 36 may be in a range of about 40:60 to about 60:40.

The fire suppression layers 34, 36 optionally may comprise a binder. The binder may provide cohesion between the components of the fire suppression layers 34, 36 (e.g., the crosslinked cyclopolyphosphazenes and the optional ceramic material particles) and may help the fire suppression layers 34, 36 respectively adhere to the first and second sides 30, 32 of the microporous layer 28. The binder may comprise a polymeric material, e.g., polyvinylidene fluoride (PVdF), polyvinylpyrrolidone (PVP), ethylene propylene diene monomer (EPDM) rubber, styrene butadiene rubber (SBR), carboxymethyl cellulose (CMC), polyacrylic acid, SOTERAS™ CCS two-component binder, or a combination thereof. When present in the fire suppression layers 34, 36, the binder may constitute, by mass, greater than or equal to about 1% or about 2% to less than or equal to about 10% or about 5% of the fire suppression layers 34, 36. In some aspects, the binder may constitute, by mass, about 3% of the fire suppression layers 34, 36.

Figure 5:
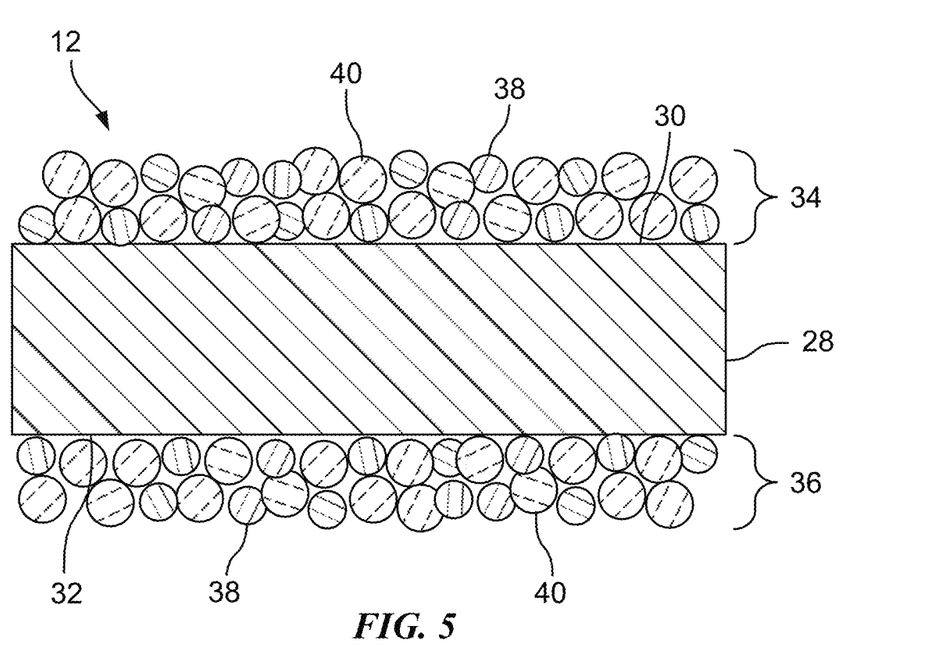
FIG. 5 a schematic side cross-sectional view of the composite separator of FIG. 1, wherein the composite separator includes first and second fire suppression layers disposed on opposite first and second sides of a microporous layer, and wherein each of the first and second fire suppression layers comprises a mixture of crosslinked cyclopolyphosphazene particles and ceramic material particles.

Referring now to FIG. 5, the first fire suppression layer 34 may comprise a mixture of crosslinked cyclopolyphosphazene particles 38 and ceramic material particles 40 disposed on the first side 30 of the microporous layer 28 and the second fire suppression layer 36 may comprise a mixture of crosslinked cyclopolyphosphazene particles 38 and ceramic material particles 40 disposed on the second side 32 of the microporous layer 28.

The positive electrode 14 is porous and may comprise one or more electrochemically active positive electrode materials that can undergo a reversible redox reaction with lithium, e.g., a material that can sufficiently undergo lithium intercalation and deintercalation, alloying and dealloying, or plating and stripping. In one form, the positive electrode 14 may comprise an intercalation host material that can undergo the reversible insertion or intercalation of lithium ions. In such case, the intercalation host material of the positive electrode 14 may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). In another form, the positive electrode 14 may comprise a conversion material including a component that can undergo a reversible electrochemical reaction with lithium, in which the component undergoes a phase change or a change in crystalline structure accompanied by a change in oxidation state. In such case, the conversion material of the positive electrode 14 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of metals for inclusion in the conversion material of the positive electrode 14 include iron, manganese, nickel, copper, and cobalt. The electrochemically active positive electrode material of the positive electrode 14 may be intermingled with a polymeric binder to provide the positive electrode 14 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode 14 optionally may include particles of an electrically conductive material, which may comprise very fine particles of, for example, high-surface area carbon black.

The negative electrode 16 is spaced apart from the positive electrode 14 by the composite separator 12. The negative electrode 16 may be porous or nonporous. In some aspects, the negative electrode 16 may comprise, consist essentially of, or consist of lithium (Li) metal. For example, in some aspects, the negative electrode 16 may comprise, by weight, greater than 97% lithium or greater than 99% lithium and may be substantially free of elements or compounds that undergo a reversible redox reaction with lithium during operation of the electrochemical cell 10. In other aspects, the negative electrode 16 may comprise an electrochemically active negative electrode material that can undergo the reversible insertion or intercalation of lithium ions or that can react with lithium to form a lithium-containing intermetallic compound. The electrochemically active negative electrode material of the negative electrode 16 may comprise a silicon-based material, a carbon-based material (e.g., graphite, activated carbon, carbon black, and/or graphene), tin oxide, aluminum, indium, zinc, germanium, titanium oxide, and/or lithium titanate. The electrochemically active negative electrode material of the negative electrode 16 may be intermingled with the same polymeric binder(s) and/or the same electrically conductive material particles as that of the positive electrode 14.

The liquid electrolyte 18 infiltrates the pores of the composite separator 12 and the positive electrode 14 and is in physical and ionic contact with the negative electrode 16. In aspects where the negative electrode 16 is porous, the electrolyte 18 may infiltrate the pores of the composite separator 12, the positive electrode 14, and the negative electrode 16. The electrolyte 18 is formulated to facilitate the transport of lithium ions between the positive electrode 14 and the negative electrode 16 during cycling of the electrochemical cell 10. The liquid electrolyte 18 may be in the form of a solution and may comprise one or more lithium salts dissolved in a nonaqueous aprotic organic solvent or a mixture of nonaqueous aprotic organic solvents. Examples of lithium salts include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide (LiN$(FSO_2)_2$) (LiSFI), and combinations thereof. Examples of nonaqueous aprotic organic solvents include organic carbonates, for example, cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The positive and negative electrode current collectors 20, 22 may be in the form of thin and flexible porous or non-porous electrically conductive metal substrates. Each of the positive and negative electrode current collectors 20, 22 may comprise a metal that is capable of collecting and reversibly passing free electrons to and from their respective electrodes 14, 16. The term "metal," as used herein with respect to the positive and negative electrode current collectors 20, 22, may refer to a pure elemental metal or to a combination (e.g., an alloy) of an elemental metal and one or more other metal or nonmetal elements. For example, the positive and negative electrode current collectors 20, 22 may comprise or consist of a transition metal. In aspects, the positive electrode current collector 20 may comprise aluminum (Al), nickel (Ni), or an iron (Fe) alloy (e.g., stainless steel) and the negative electrode current collector 22 may comprise copper (Cu), nickel (Ni), an iron (Fe) alloy (e.g., stainless steel), or titanium (Ti). Other electrically conductive metals may of course be used, if desired.

The composite separator 12 may be manufactured by depositing the crosslinked cyclopolyphosphazenes on the first side 30 and/or the second side 32 of the microporous layer 28 to form the fire suppression layers 34, 36. The crosslinked cyclopolyphosphazenes may be deposited on the first side 30 and/or the second side 32 of the microporous layer 28 in the form of a slurry. The slurry may comprise the crosslinked cyclopolyphosphazenes, a solvent, and optionally a binder. The crosslinked cyclopolyphosphazenes and the optional binder may be suspended in the solvent. In aspects where the fire suppression layers 34, 36 comprise a ceramic material, the slurry may comprise particles of the ceramic material.

The solvent may be aqueous (e.g., water) or nonaqueous (e.g., an organic solvent). Examples of nonaqueous organic solvents include N-methyl-2-pyrrolidone (NMP). The binder may comprise a polymeric material, e.g., polyvinylidene fluoride (PVdF), polyvinylpyrrolidone (PVP), ethylene propylene diene monomer (EPDM) rubber, styrene butadiene rubber (SBR), carboxymethyl cellulose (CMC), polyacrylic acid, SOTERAS™ CCS two-component binder, or a combination thereof. After the slurry is applied to the first side 30 and/or the second side 32 of the microporous layer 28, the solvent may be removed from the slurry, e.g., by evaporation, to form the first and second fire suppression layers 34, 36 respectively on the first side 30 and/or the second side 32 of the microporous layer 28. For example, the solvent may be removed from the slurry by heating under vacuum at a temperature of greater than or equal to about 50° C. to less than or equal to about 80° C. for greater than or equal to about 2 hours to less than or equal to about 48 hours.

EXPERIMENTAL

Composite separators having first and second fire suppression layers disposed on opposite first and second sides thereof were prepared, assembled into electrochemical cells, and the electrochemical stability and performance of the electrochemical cells was evaluated.

Composite separators including the crosslinked cyclopolyphosphazene particles were prepared by depositing a mixture of crosslinked cyclopolyphosphazene (PZS) particles and lithium ion exchanged zeolite (LiZ) particles on opposite first and second sides of polymer membranes. The fire suppression layers including the PZS particles and the LiZ particles were coated on the first and second sides of the polymer membranes at thicknesses of about 10 micrometers. The polymer membranes were made of a laminate of PP/PE/PP and had thicknesses of about 20 micrometers. The PZS particles had a mean particle diameter in the range of 400 nanometers to 800 nanometers and constituted, by mass, about 55% of the first and second fire suppression layers. The LiZ particles were of the Y (FAU) zeolite framework type, had a mean particle diameter in the range of 50 nanometers to 5 micrometers, and constituted, by mass, about 42% of the first and second fire suppression layers.

For comparison, composite separators were prepared without PZS particles, but with LiZ particles coated on the first and second sides of the polymer membranes. LiZ particles were coated on the first and second sides of the polymer membranes at thicknesses of about 10 micrometers.

The PZS-LiZ separators and the LiZ separators were incorporated into electrochemical cells including lithium metal anodes (30 μm Li foil), NMC622 cathodes (3.75 mAh/cm$^2$), and a FEC/DMC+LiPF$_6$ liquid electrolyte (30 μL). The PZS-LiZ separators contained about 0.65 milligrams of PZS particles each.

Figure 6:
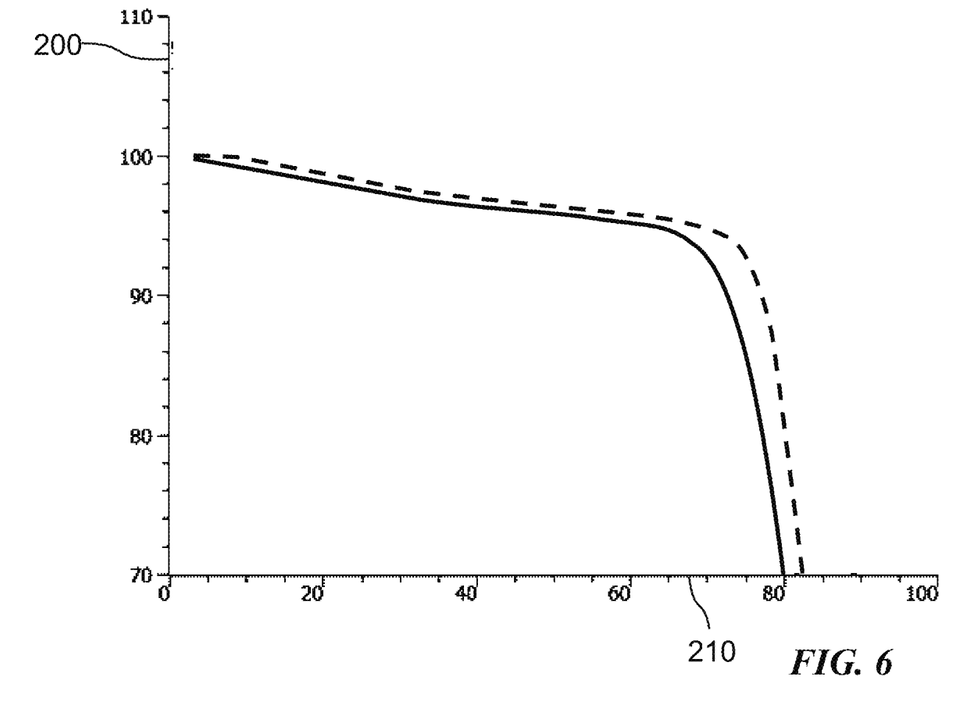
FIG. 6 depicts plots of capacity retention (%) vs. cycle number for an electrochemical cell including a composite separator having a mixture of crosslinked cyclopolyphosphazene particles and lithium ion exchanged zeolite particles deposited on opposite first and second sides of a polymer membrane (solid line) and an electrochemical cell including a separator having lithium ion exchanged zeolite particles deposited on opposite first and second sides of a polymer membrane (dashed line).

The electrochemical cycling performance of the cells including the PZS-LiZ separators and the cells including the LiZ separators was evaluated using galvanostatic charge-discharge cycling. The areal capacity (mAh/cm$^2$) of the as-prepared electrochemical cells was measured while cycling the cells between voltages of 3V to 4.3V at a C/10 charge/discharge rate for the first two cycles, followed by charging at a C/5 charge rate and discharging at a C/2 discharge rate for an additional 80-90 cycles. FIG. 6 depicts plots of capacity retention (%) 200 vs. cycle number 210 for one of the cells including a PZS-LiZ separator (solid line) and one of the cells including a LiZ separator (dashed line). The areal capacity measurements indicate that cells including the PZS-LiZ separators exhibit substantially the same areal capacity during at least the first 70 cycles as cells including the LiZ separators. This indicates that the addition of the PZS particles does not have a negative impact on cycle life.

Figure 7:
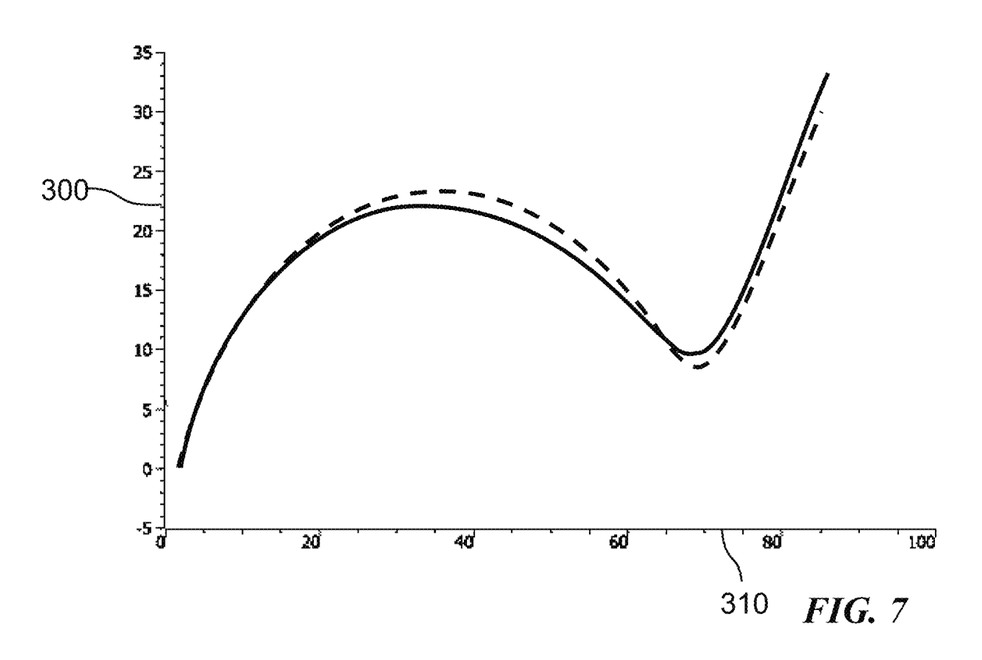
FIG. 7 depicts Nyquist plots of -Im (Z)/Ohm vs. Re (Z)/Ohm for an electrochemical cell including a composite separator having a mixture of crosslinked cyclopolyphosphazene particles and lithium ion exchanged zeolite particles deposited on opposite first and second sides of a polymer membrane (solid line) and an electrochemical cell including a separator having lithium ion exchanged zeolite particles deposited on opposite first and second sides of a polymer membrane (dashed line).

Impedance measurements were performed on the cells including the PZS-LiZ separators and the LiZ separators using electrochemical impedance spectroscopy. FIG. 7 depicts Nyquist plots of -Im (Z)/Ohm 300 vs. Re (Z)/Ohm 310 for one of the cells including a PZS-LiZ separator (solid line) and one of the cells including a LiZ separator (dashed line). The impedance measurements indicate that the addition of the PZS particles does not negatively impact cell impedance. In other words, the cells including the PZS-LiZ separators and the cells including the LiZ separators exhibited substantially the same cell impedance.

The electrochemical stability of the cells including the PZS-LiZ separators and the LiZ separators was evaluated using cyclic voltammetry. The cyclic voltammetry measurements indicate that the addition of the PZS particles does not negatively impact the electrochemical stability of the cells including the PZS-LiZ separators, as compared to the cells including the LiZ separators.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A separator for an electrochemical cell that cycles lithium ions, the separator comprising:
    a microporous layer having a first side and an opposite second side; and
    one or more fire suppression layers disposed on at least one of the first side or the second side of the microporous layer, the one or more fire suppression layers comprising crosslinked cyclopolyphosphazene particles, the crosslinked cyclopolyphosphazene particles being formed by a nucleophilic polycondensation polymerization reaction between a cyclophosphazene and a comonomer selected from the group consisting of: 4,4'-(hexafluoroisopropylidene)diphenol, 4,4'-(9-fluorenylidene)diphenol, phenolphthalein, oxyresveratrol, resveratrol, dopamine, 4 4'-(hexafluoroisopropylidene)dianiline, 4,4'-(9-fluorenylidene)dianiline, anilinephthalein, and combinations thereof.

2. The separator of claim 1, wherein the cyclophosphazene is an organophosphorus compound represented by the chemical formula:

where $X^1$, $X^2$, $X^3$, $X^4$, $X^5$, and $X^6$ are each individually a halide.

3. The separator of claim 1, wherein the crosslinked cyclopolyphosphazene particles are spherical particles having mean particle diameters of greater than or equal to about 50 nanometers to less than or equal to about 2 micrometers.

4. The separator of claim 1, wherein the crosslinked cyclopolyphosphazene particles are tubular particles having widths of greater than or equal to about 50 nanometers to less than or equal to about 200 nanometers and lengths of greater than or equal to about 500 nanometers to less than or equal to about 2 micrometers.

5. The separator of claim 1, wherein the crosslinked cyclopolyphosphazene particles constitute, by mass, greater than or equal to about 1% to less than or equal to about 80% of the one or more fire suppression layers.

6. The separator of claim 1, wherein the one or more fire suppression layers further comprise a binder.

7. The separator of claim 1, wherein the microporous layer comprises a polyolefin.

8. The separator of claim 1, wherein each of the one or more fire suppression layers has a thickness of greater than or equal to about 1 micrometer to less than or equal to about 30 micrometers.

9. The separator of claim 1, wherein the one or more fire suppression layers further comprise particles of a ceramic material, and wherein the ceramic material comprises alumina, silica, a dehydrated zeolite, a lithiated zeolite, or a combination thereof.

10. The separator of claim 9, wherein the particles of the ceramic material have a mean particle diameter of greater than or equal to about 50 nanometers to less than or equal to about 5 micrometers.

11. An electrochemical cell that cycles lithium ions, the electrochemical cell comprising:
a negative electrode;
a positive electrode spaced apart from the negative electrode, the positive electrode comprising a transition metal oxide that can undergo a reversible intercalation of lithium ions; and
a composite separator sandwiched between the negative electrode and the positive electrode, the composite separator comprising:
a microporous layer having a first side and an opposite second side, the microporous layer comprising a polyolefin, and
one or more fire suppression layers disposed on at least one of the first side or the second side of the microporous layer, the one or more fire suppression layers comprising crosslinked cyclopolyphosphazene particles,
wherein the crosslinked cyclopolyphosphazene particles are formed by a nucleophilic polycondensation polymerization reaction between a cyclophosphazene and a comonomer selected from the group consisting of: 4,4'-(hexafluoroisopropylidene)diphenol, 4,4'-(9-fluorenylidene)diphenol, phenolphthalein, oxyresveratrol, resveratrol, dopamine, 4 4'-(hexafluoroisopropylidene)dianiline, 4,4'-(9-fluorenylidene)dianiline, anilinephthalein, and combinations thereof.

12. The electrochemical cell of claim 11, wherein the cyclophosphazene is an organophosphorus compound represented by the chemical formula:

where $X^1$, $X^2$, $X^3$, $X^4$, $X^5$, and $X^6$ are each individually a halide.

13. The electrochemical cell of claim 11, wherein the one or more fire suppression layers further comprise particles of a ceramic material, and wherein the ceramic material comprises alumina, silica, a dehydrated zeolite, a lithiated zeolite, or a combination thereof.

14. The electrochemical cell of claim 11, further comprising:
a liquid electrolyte infiltrating pores of the composite separator and establishing a lithium-ion transport path between the negative electrode and the positive electrode, wherein the liquid electrolyte comprises a lithium salt dissolved in a nonaqueous organic solvent, and wherein the nonaqueous organic solvent comprises an organic carbonate, an aliphatic carboxylic ester, or a combination thereof.

15. The electrochemical cell of claim 14, wherein the crosslinked cyclopolyphosphazene particles exhibit a solubility of, by mass, less than or equal to about 1% in the nonaqueous organic solvent.

16. A method of manufacturing a composite separator for an electrochemical cell that cycles lithium ions, the method comprising:
preparing a precursor mixture comprising a cyclophosphazene, a comonomer, an organic solvent, and a tertiary amine catalyst to initiate a nucleophilic polycondensation polymerization reaction between the cyclophosphazene and the comonomer and form crosslinked cyclopolyphosphazene particles, the cyclophosphazene having the chemical formula (—N=P(—X)$_2$—)$_3$, where X is a halogen, the comonomer being selected from the group consisting of: 4,4'-(hexafluoroisopropylidene)diphenol, 4,4'-(9-fluorenylidene)diphenol, phenolphthalein, oxyresveratrol, resveratrol, dopamine, 4 4'-(hexafluoroisopropylidene)dianiline, 4,4'-(9-fluorenylidene)dianiline, anilinephthalein, and combinations thereof;
dispersing the crosslinked cyclopolyphosphazene particles in a solvent to form a slurry;
depositing the slurry on at least one of a first side or an opposite second side of a microporous polyolefin layer; and
removing the solvent from the slurry to form one or more fire suppression layers disposed on at least one of the first side or the second side of the microporous polyolefin layer.

* * * * *